(12) United States Patent
Baldanza et al.

(10) Patent No.: US 7,155,883 B2
(45) Date of Patent: Jan. 2, 2007

(54) PACKAGING MACHINE FOR WRAPPING PRODUCTS IN RESPECTIVE SHEETS OF HEAT-SEAL WRAPPING MATERIAL

(75) Inventors: Nicola Baldanza, Casalecchio di Reno (IT); Moreno Cremonini, Castello Serravalle (IT); Giordano Gorrieri, Pianoro (IT)

(73) Assignee: KPL Packaging S.p.A., Casalecchio di Reno (IT)

( * ) Notice: Subject to any disclaimer, the term of this patent is extended or adjusted under 35 U.S.C. 154(b) by 52 days.

(21) Appl. No.: 10/997,817

(22) Filed: Nov. 23, 2004

(65) Prior Publication Data

US 2005/0126116 A1  Jun. 16, 2005

(30) Foreign Application Priority Data

Nov. 28, 2003 (EP) ................... 03425766

(51) Int. Cl.
*B65B 9/06* (2006.01)
*B65B 51/10* (2006.01)

(52) U.S. Cl. ................. 53/552; 53/374.3; 53/374.5; 156/582

(58) Field of Classification Search .......... 53/228, 53/550, 552, 374.3, 374.4, 374.5, 450, 466; 156/359, 366, 582, 583.1
See application file for complete search history.

(56) References Cited

U.S. PATENT DOCUMENTS

| | | | |
|---|---|---|---|
| 3,522,689 A * | 8/1970 | Wylie et al. .............. | 53/552 |
| 3,693,319 A | 9/1972 | Hunsader | |
| 3,815,313 A * | 6/1974 | Heisler .................... | 53/466 |
| 3,955,338 A * | 5/1976 | Winzeler et al. ............ | 53/550 |
| 4,199,919 A | 4/1980 | Moscatelli | |
| 4,288,968 A * | 9/1981 | Seko et al. ................ | 53/550 |
| 4,702,060 A * | 10/1987 | Reid ...................... | 53/374.5 |
| 4,905,446 A * | 3/1990 | Dieckbernd et al. ....... | 53/374.4 |
| 5,433,063 A * | 7/1995 | Kovacs et al. ............. | 53/550 |
| 5,678,390 A | 10/1997 | Pruett et al. | |
| 6,408,600 B1 * | 6/2002 | Nankervis et al. ........... | 53/477 |
| 6,656,310 B1 * | 12/2003 | Basque ................... | 156/583.1 |
| 6,719,863 B1 * | 4/2004 | Basque ................... | 156/583.1 |
| 6,907,716 B1 * | 6/2005 | Cinotti et al. ............. | 53/550 |
| 7,032,365 B1 * | 4/2006 | Cinotti .................... | 53/550 |

FOREIGN PATENT DOCUMENTS

GB    1 239 023    7/1971

OTHER PUBLICATIONS

European Search Report (EPC No. 03425766.7).

* cited by examiner

*Primary Examiner*—Louis Huynh
(74) *Attorney, Agent, or Firm*—Klarquist Sparkman, LLP

(57) ABSTRACT

A packaging machine has a wrapping device for forming a tubular wrapping from a continuous web of heat-seal material, and for feeding products successively into the tubular wrapping; each product being located between two free tubular portions of the tubular wrapping, which are folded substantially onto the relative products, and are stabilized by at least one pair of sealing devices, each of which has a sealing surface heated electrically by a heating device, operation of which is controlled by a control device carried by the sealing device and for determining an actual temperature of the sealing surface.

12 Claims, 5 Drawing Sheets

PACKAGING MACHINE FOR WRAPPING PRODUCTS IN RESPECTIVE SHEETS OF HEAT-SEAL WRAPPING MATERIAL

CROSS REFERENCE TO RELATED APPLICATIONS

This application claims priority under 35 U.S.C. § 119 from European Patent Application No. 03425766.7, filed Nov. 28, 2003. The prior application is incorporated herein by this reference.

BACKGROUND

The present invention relates to a packaging machine for wrapping products in respective sheets of heat-seal wrapping material.

More specifically, the present invention relates to a packaging machine for wrapping products, each defined by one or more articles. In the following description, the articles considered are groups of rolls of paper, to which the following description refers purely by way of example.

Known machines for packaging rolls of paper normally comprise a wrapping unit for forming a tubular wrapping from a continuous web of heat-seal material, feeding groups of rolls of paper successively into the tubular wrapping so that each group of rolls is located between two free tubular portions of the tubular wrapping, and transferring the tubular wrapping and the groups of rolls to a sealing station.

The sealing station is equipped with a first group of sealing bars movable continuously along an endless first path extending in a vertical plane, and a second group of sealing bars movable continuously along an endless second path extending in said vertical plane and beneath the first path. The two endless paths comprise a common portion defining a sealing path, along which each bar in the first group of bars is fed in time with a corresponding bar in the second group of bars, so as to feed a respective group of rolls along the sealing path at a variable travelling speed.

Each bar has a hot sealing surface, which is heated electrically by a heating device with sliding electric contacts and comprising at least one guide of conducting material mounted parallel to the sealing path, and at least one brush, also made of conducting material, which is carried by the bar, is connected electrically to the sealing surface, and is engaged in sliding manner along the guide.

By combining the variable travelling speeds of the pairs of bars and, hence, of the groups of rolls along the sealing path, each free tubular portion is folded partly onto the respective groups of rolls, and is partly pressed between the respective sealing surfaces and stabilized by heat sealing.

Since the temperature of the sealing surfaces along the sealing path must be at least equal to a given sealing temperature, known packaging machines of the above type have several drawbacks, mainly due to the sealing surfaces being heated by electric current of constant intensity calculated experimentally and actually corresponding to a relatively high operating temperature which is normally higher than the sealing temperature.

Because of the high operating temperature, the sealing surfaces, which are brought into contact with each other to perform the respective sealing operations, undergo severe expansion and contraction, which result in relatively severe sliding friction and, hence, relatively severe wear of the sealing surfaces themselves.

SUMMARY

It is an object of the present invention to provide a packaging machine for wrapping products in respective sheets of heat-seal wrapping material, designed to eliminate the aforementioned drawbacks.

According to one embodiment, there is provided a packaging machine for wrapping products in respective sheets of heat-seal wrapping material, the machine comprising wrapping means for forming a tubular wrapping from a continuous web of heat-seal material, and for feeding the products successively into the tubular wrapping, each product being located between two free tubular portions of said tubular wrapping; sealing and feed means comprising at least one pair of sealing devices movable along a sealing path to feed a said product at a variable travelling speed along the sealing path, and to perform a respective sealing operation on a respective said tubular portion, each sealing device having a hot sealing surface; and, for each sealing device, heating means for electrically heating the relative sealing surface; and being characterized in that each sealing device has control means for determining an actual temperature of the respective sealing surface, and for controlling said heating means as a function of said actual temperature.

BRIEF DESCRIPTION OF THE DRAWINGS

A non-limiting embodiment of the present invention will be described by way of example with reference to the accompanying drawings, in which.

DETAILED DESCRIPTION OF THE INVENTION

Figure 1:
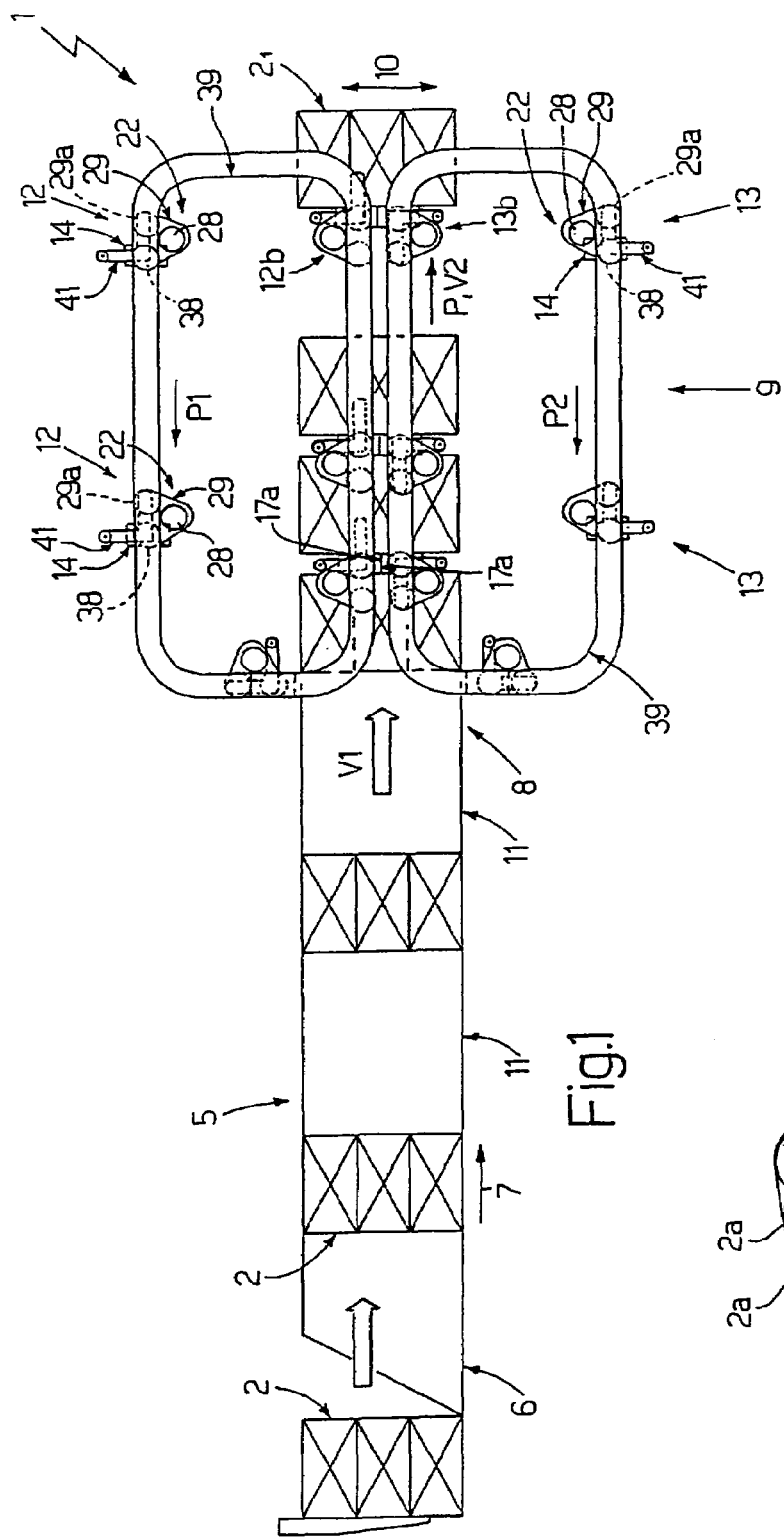
FIG. 1 shows a schematic side view of a preferred embodiment of the packaging machine according to the present invention.
Figure 2:
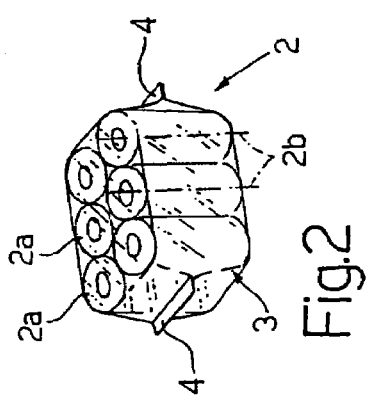
FIG. 2 shows a schematic view in perspective of a first detail in FIG. 1.

With reference to FIGS. 1 and 2, number 1 indicates as a whole a packaging machine for wrapping products 2 in respective sheets 3 of transparent heat-seal material, each of which, in the finished configuration of the respective wrapped product 2, is folded about and substantially onto respective product 2, and is stabilized by a longitudinal side seal along a longitudinal overlap portion (not shown) of sheet 3, and by two end seals at respective transverse overlap portions 4 of sheet 3.

As shown in FIG. 2, each product 2 is defined by six rolls of paper 2a arranged with their longitudinal axes 2b parallel. Obviously, in alternative embodiments not shown, rolls 2a defining each product 2 are other than six in number and arranged otherwise than as shown in FIG. 2.

Machine 1 comprises a known wrapping unit 5 for forming a tubular wrapping 6 from a continuous web of transparent heat-seal material (not shown); stabilizing wrapping 6 by a longitudinal side seal along a longitudinal overlap portion (not shown) of wrapping 6; feeding products 2 successively inside wrapping 6; and feeding wrapping 6 and products 2 in a substantially horizontal direction 7 and at a substantially constant travelling speed V1 to an input station 8 of a sealing unit 9.

Products 2 are positioned inside wrapping 6 with their axes 2b parallel to a substantially vertical direction 10 crosswise to direction 7, and are equally spaced along wrapping 6 so that each product 2 is located between two free tubular portions 11 of wrapping 6. Each portion 11 is of a length, measured parallel to direction 7, equal to the height of a product 2, measured parallel to direction 10, plus twice the length of an overlap portion 4 measured parallel to direction 7.

Unit 9 comprises a number of—in the example shown, six—top sealing devices 12 movable along an endless path P1 extending in a substantially vertical plane; and a number of bottom sealing devices 13, which are equal in number to devices 12, cooperate with corresponding devices 12, and are movable along an endless path P2 extending in the same plane as path P1, and having a horizontal portion in common with path P1 and defining a sealing path P.

Figure 3:
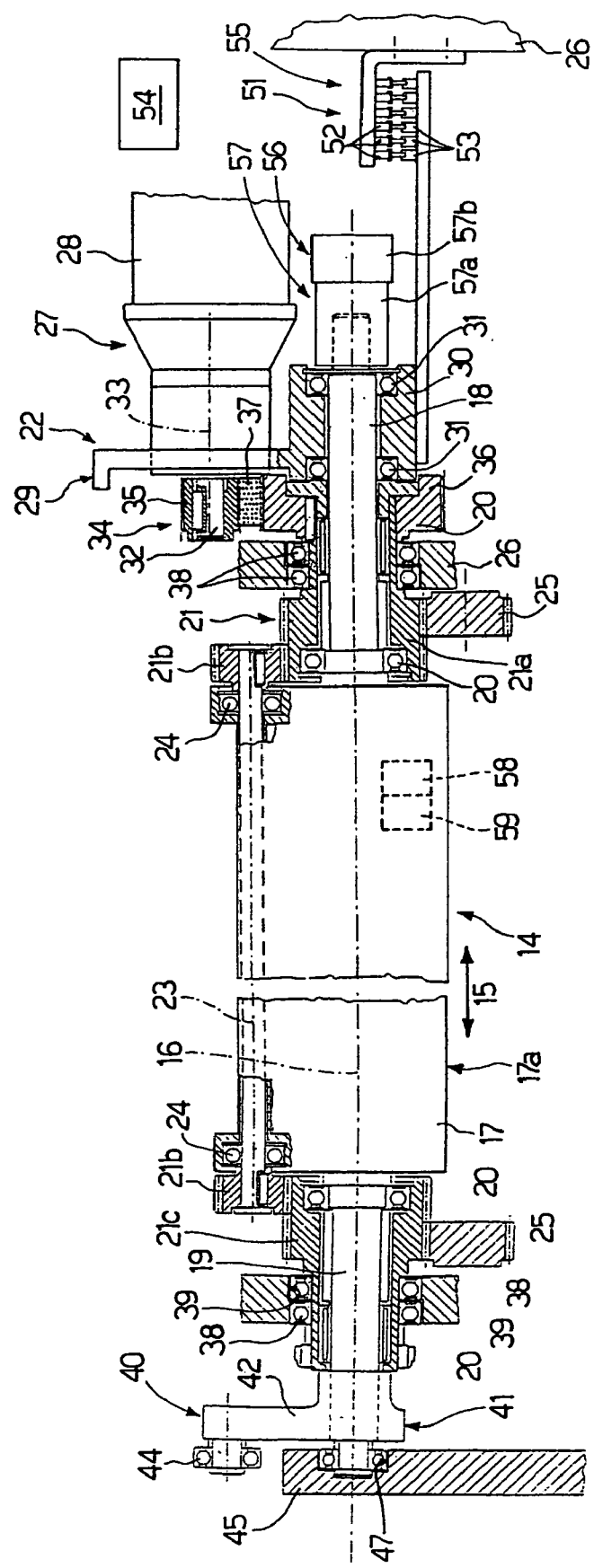
FIG. 3 shows a schematic side view, with parts in section and parts removed for clarity, of a second detail in FIG. 1.

With reference to FIG. 3, each device 12, 13 comprises a sealing bar 14, which extends in a direction 15 crosswise to respective path P1, P2, has a longitudinal axis 16 parallel to direction 15, and comprises a substantially parallelepiped-shaped, substantially rectangular-section central portion 17 having a heated flat surface 17a of a width, measured parallel to path P, substantially equal to twice the length of an overlap portion 4 also measured parallel to path P (FIGS. 1 and 2).

Bar 14 also comprises two substantially cylindrical end pins 18 and 19, which are located on opposite sides of portion 17 in direction 15, are coaxial with axis 16, and respectively engage, in rotary and axially fixed manner, via the interposition of respective pairs of rolling bearings 20, an input gear 21a and an output gear 21c of a gear train 21, which, in the example shown, comprises three gears 21a, 21b, 21c, and forms part of a carriage 22 for conveying bar 14 along respective path P1, P2.

The intermediate gear 21b is located between gears 21a and 21c, has a longitudinal axis 23 substantially parallel to axis 16, and is engaged in rotary and axially fixed manner, through portion 17 and via the interposition of a pair of rolling bearings 24, to rotate, with respect to portion 17, about axis 23.

Gears 21a and 21c mesh with respective racks 25 fitted to a fixed frame 26 of machine 1 and extending along respective path P1, P2, and are rotated about axis 16 to move carriage 22, and therefore bar 14, along respective path P1, P2 by means of an actuating device 27 comprising an electric motor 28 fixed to a substantially flat portion of a supporting member 29. Member 29 forms part of carriage 22, is substantially triangular in shape, and also comprises a sleeve 30 coaxial with axis 16 and engaged in rotary and axially fixed manner by pin 18 with the interposition of a pair of rolling bearings 31.

Motor 28 has an output shaft 32 mounted to rotate about a substantially longitudinal axis 33 parallel to axis 16, and which is connected to gear 21a by a belt drive 34 forming part of device 27, and comprising a pulley 35 fitted to shaft 32 and coaxial with axis 33, a pulley 36 fitted to gear 21a and coaxial with axis 16, and a belt 37 looped about pulleys 35 and 36.

To control the position of carriage 22, and therefore of bar 14, crosswise to relative path P1, P2, each gear 21a, 21c supports a pair of rolling bearings 38, each of which is fitted to respective gear 21a, 21c coaxially with axis 16, and engages a respective race 39 formed through frame 26, extending parallel to respective path P1, P2, and of a height, measured crosswise to respective path P1, P2, greater than the outside diameter of respective bearing 38. Races 39 being offset with respect to each other in a direction crosswise to respective path P1, P2, each bearing 38 contacts only one side of respective race 39, and so moves along respective path P1, P2 with a rotary-transitional motion.

To control the angular position of member 29 about axis 16, member 29 has a supporting pin (not shown) extending in direction 15 and supporting a pair of rolling bearings 29a (FIG. 1), which engage the races 39 of gear 21a to prevent member 29 from rotating about axis 16.

The angular position of bar 14 and, therefore, of surface 17a about axis 16 and with respect to carriage 22 is controlled by an orienting device 40 for keeping surface 17a substantially parallel to relative path P1, P2 at least along sealing path P.

With reference to FIGS. 1 and 3, device 40 comprises a rocker arm 41 fitted to a free end of pin 19, coaxially with axis 16, and having two arms 42, 43, each of which extends radially outwards from pin 19, and is fitted on a free end with a tappet roller 44, 45, which is mounted for rotation on respective arm 42, 43, and engages a respective fixed cam 46, 47 (FIG. 4) for controlling the angular position of rocker arm 41 and, therefore, of bar 14 about axis 16, and for oscillating bar 14 about axis 16 according to a given law.

Figure 4:
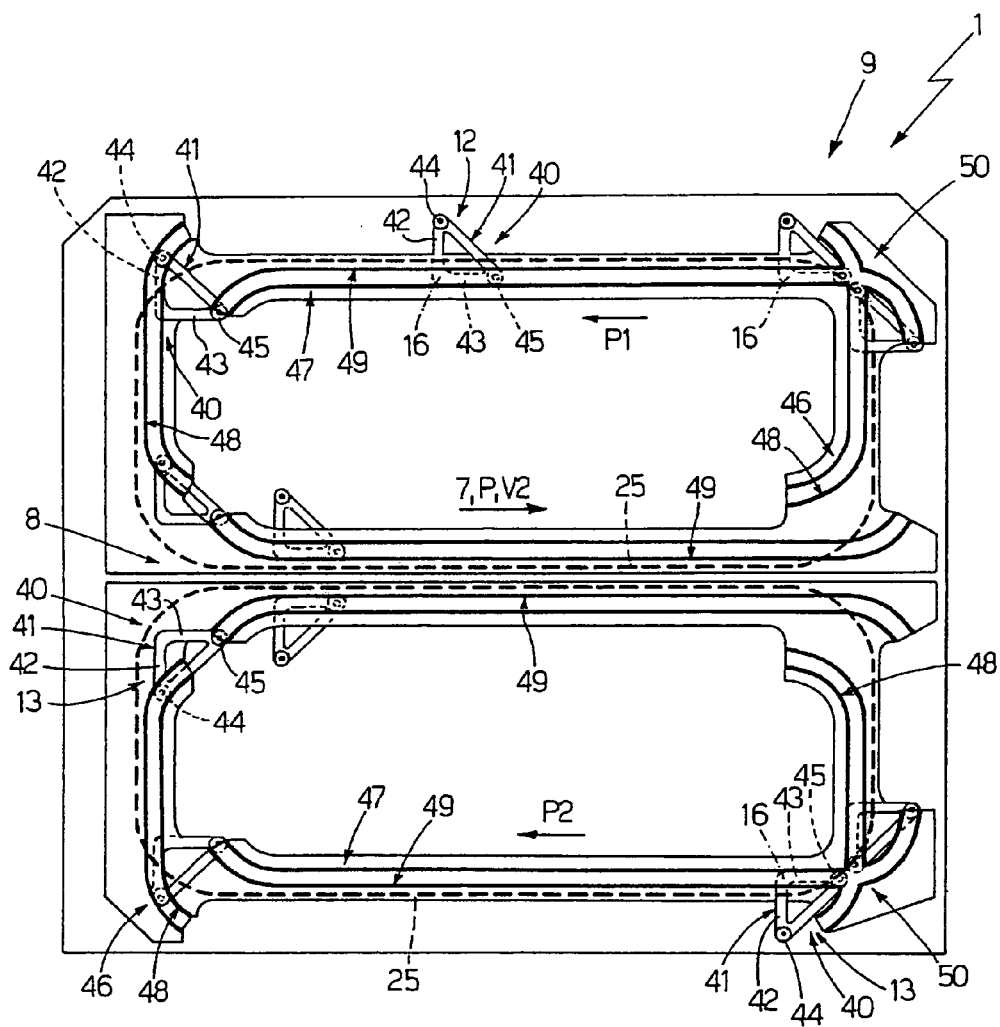
FIG. 4 shows a schematic side view, with parts removed for clarity, of a third detail in FIG. 1.

As shown in FIG. 4, each cam 46, 47 comprises two separate portions 48, 49, which are located, with respect to portions 48, 49 of the other cam 46, 47, so that, along the straight portions of paths P1, P2, only one tappet roller 44, 45 engages respective cam 46, 47, i.e. the roller 44, 45 aligned with axis 16 in the travelling direction of sealing devices 12, 13 along respective paths P1, P2.

In connection with the above, it should be pointed out that, at one of the curved portions of each path P1, P2, relative cams 46, 47 have an intersection portion 50 where the angular position of each rocker arm 41 about axis 16 is controlled by a respective third tappet roller (not shown) engaging a third cam (not shown).

With reference to FIG. 3, electric motors 28 are powered by a power device 51 with sliding electric contacts and comprising, for each path P1, P2, a number of (in the example shown, six) guides 52, which are made of conducting material, are fitted to frame 26, are normally common to all of respective motors 28, and are looped along respective path P1, P2. Device 51 also comprises, for each motor 28, a number of brushes 53, which are also made of conducting material, are equal in number to guides 52, are carried by respective carriage 22, and engage respective guides 52 in sliding manner as respective sealing device 12, 13 is fed along relative path P1, P2.

Each actuating device 27 is therefore operated independently of the other devices 27 under the control of a respective electronic central control unit 54 (FIG. 5), so that sealing devices 12, 13 are fed along respective paths P1, P2 with independent laws of motion.

Figure 5:
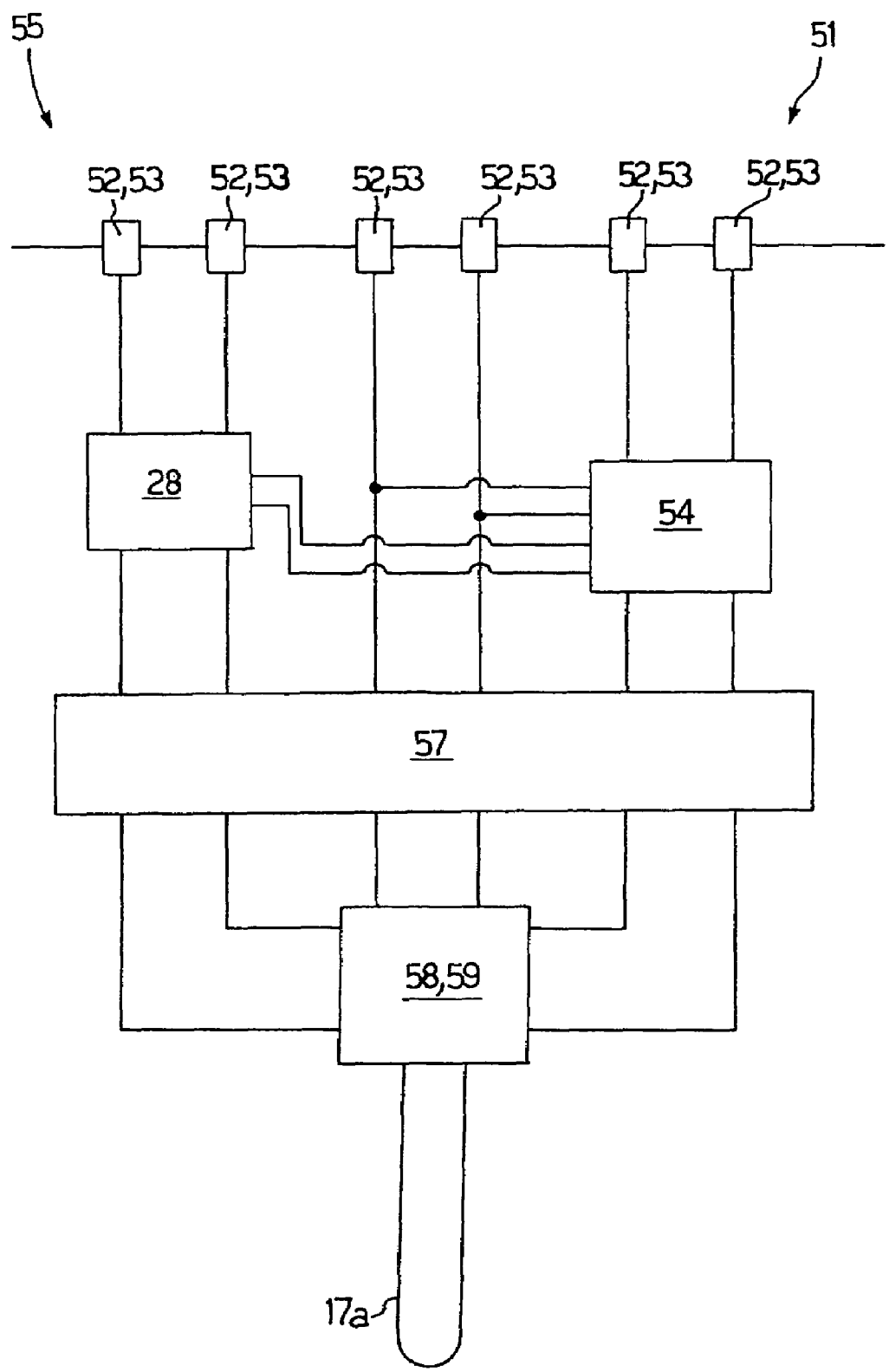
FIG. 5 shows a schematic view of a detail in FIG. 3.

With reference to FIGS. 3 and 5, surfaces 17a are heated electronically by a heating device 55 comprising the sliding electric contacts defined by guides 52 and by brushes 53, and, for each surface 17a, the respective central control unit 54 and an electric circuit 56. Circuit 56 comprises a rotary electric connector 57, in turn comprising a portion 57a fitted to pin 18, and a portion 57 b fitted in rotary manner to portion 57a and connected electrically to brushes 53.

Portion 57a is connected electrically to a voltage regulating device 58 fitted to respective bar 14 and feedbackcontrolled by a control device 59, which is also fitted to respective bar 14 and detects the actual temperature of respective surface 17a.

Since bar 14 comprises an electric resistor defining surface 17a and through which electric current flows, device 59 indirectly detects the actual temperature of surface 17a by detecting the actual value of the above electric resistor.

In variations not shown, device 59 comprises a temperature sensor for directly detecting the actual temperature of surface 17a, or a strain gauge for indirectly detecting the actual temperature of surface 17a by detecting expansion and contraction of surface 17a.

Once the actual temperature of surface 17a is determined, device 59 controls voltage regulating device 58 to supply the above electric resistor with electric current corresponding to a desired sealing temperature of surface 17a.

By providing each bar 14 with respective devices 58 and 59, the actual temperature of respective surface 17a can be controlled and maintained substantially equal at all times to the desired sealing temperature, the sealing temperature can be controlled selectively as a function of speeds V1 and V2 and the type of heat-seal material used, and the actual temperature of respective surface 17a can be controlled selectively in the event of malfunctioning of machine 1.

By virtue of the design of guides 52, each surface 17a can be supplied electrically, not only as respective bar 14 travels along sealing path P, but along the whole of respective path P1,P2. The temperature of surfaces 17a can therefore be maintained constantly equal at all times to the desired sealing temperature, so that surfaces 17a need not be supplied with relatively high electric current along path P, and are not subjected to severe expansion and contraction resulting in relatively severe sliding friction and, hence, relatively severe wear, of the mutually contacting surfaces 17a.

Figure 6:
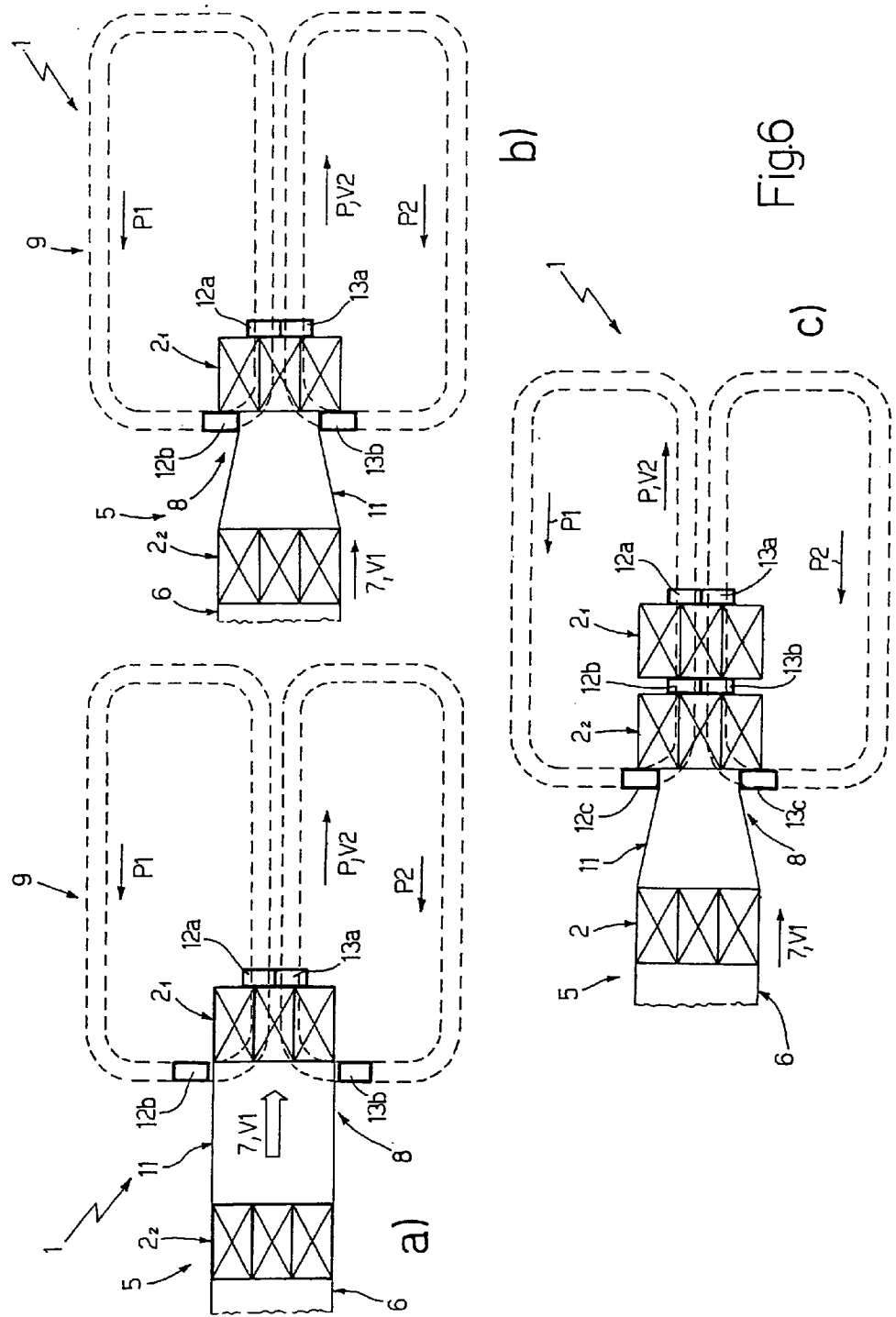
FIG. 6 shows a schematic side view of the operating principle of the packaging machine in FIG. 1.

Operation of packaging machine 1 will now be described with reference to FIGS. 1 and 6, bearing in mind that each top sealing device 12 is fed at least along sealing path P in time with a corresponding bottom sealing device 13, and as of the instant in which, as shown in FIG. 6a, the leading end of tubular wrapping 6 has been folded substantially onto a first product 2 (hereinafter indicated $2_1$) to define one of respective overlap portions 4 and the same portion 4 has been stabilized by an end seal made by a first pair of devices 12, 13 (hereinafter indicated 12a, 13a) engaging the front of product 21 in direction 7.

With reference to FIGS. 1 and 6b, the rear of product $2_1$ in direction 7 is engaged by another pair of devices 12, 13 (hereinafter indicated 12b, 13b) and fed along path P at a given travelling speed V2, while wrapping 6 and the following products 2 are fed by wrapping unit 5 in direction 7 at speed V1. Along an initial portion of path P, speed V2 of devices 12b and 13b is so controlled as to be lower than speed V1, so that, by combining speed V2 of product $2_1$ with speed V1 of the next product 2 (hereinafter indicated $2_2$) entering unit 9, and with the movement of devices 12b and 13b along respective paths P1, P2, the tubular portion 11 between products $2_1$ and $2_2$ can be folded gradually onto products $2_1$ and $2_2$ to define respective overlap portions 4, and product $2_2$ can be moved into contact with devices 12b, 13b.

As shown in FIG. 6c, the rear of product $2_2$ in direction 7 is engaged by another pair of devices 12, 13 (hereinafter indicated 12c, 13c) so that, as products $2_1$ and $2_2$ travel along an intermediate portion of path P, the overlap portions 4 between products $2_1$ and $2_2$ are stabilized by devices 12b, 13b, and are also separated, so as to separate sheet 3 of wrapping material of product $2_1$ from wrapping 6.

Finally, as shown in FIG. 1, along a final portion of path P, speed V2 is so controlled as to enable devices 12b, 13b to detach product $2_1$ from product $2_2$.

The above operating sequence relative to products $2_1$ and $2_2$ is then repeated for each new product 2 fed by wrapping unit 5 to input station 8 of sealing unit 9.

The invention claimed is:

1. A packaging machine for wrapping products in respective sheets of heat-seal wrapping material, the machine comprising wrapping means for forming a tubular wrapping from a continuous web of heat-seal material, and for feeding the products successively into the tubular wrapping, each product being located between two free tubular portions of said tubular wrapping; sealing and feed means comprising at least two pairs of sealing devices movable along a sealing path to feed a respective product at a variable travelling speed along the sealing path, and to perform a respective sealing operation on a respective said tubular portion, each sealing device, having a hot sealing surface and being movable along an endless path comprising said sealing path; and, for each sealing device, heating means for electrically heating the respective sealing surface; and being characterized in that each sealing device has control means fitted to the sealing device for moving along said endless path, for determining an actual temperature of the respective sealing surface, and for controlling said heating means as a function of said actual temperature.

2. A packaging machine as claimed in claim 1, wherein said heating means comprise a heating device having sliding electric contacts and in turn comprising at least one fixed guide made of conducting material, and at least one sliding brush, which is also made of conducting material, is carried by the respective sealing device, and engages said guide in sliding manner.

3. A packaging machine as claimed in claim 2, wherein said guide is an endless guide.

4. A packaging machine as claimed in claim 2, wherein said heating means also comprise a voltage regulating device carried by the respective sealing device and connected electrically to said brush; the regulating device selectively controlling the electric current supplied to the respective sealing surface as a function of a comparison between said actual temperature and a desired sealing temperature of the sealing surface.

5. A packaging machine as claimed in claim 4, wherein each sealing device comprises a carriage movable along said sealing path; and a sealing bar having said sealing surface and fitted to the carriage to oscillate about a respective axis with respect to the carriage; the respective said brush being carried by said carriage, and the respective regulating device being carried by said sealing bar.

6. A packaging machine as claimed in claim 5, wherein said heating means comprise an electric connector interposed between the respective brush and the respective regulating device and comprising a first element angularly integral with the respective sealing bar and connected electrically to the respective regulating device, and a second element connected in rotary manner to said first element and connected electrically to the respective brush.

7. A packaging machine as claimed in claim 1, wherein said control means maintain the temperature of said sealing surface substantially constant.

8. A packaging machine as claimed in claim 1, wherein said control means selectively control the temperature of said sealing surface as a function of the production speed of the packaging machine.

9. A packaging machine as claimed in claim 1, wherein said control means selectively control the temperature of said sealing surface as a function of the type of said heat-seal material.

10. A packaging machine as claimed in claim 1, wherein said control means reduce the temperature of said sealing surface in the event of malfunctioning of the packaging machine.

11. A packaging machine as claimed in claim 1, wherein each sealing device comprises an electric resistor; said control means determining an actual value of said electric resistor.

12. A packaging machine for wrapping products in respective sheets of heat-seal wrapping material, the machine comprising:

a wrapping device for forming a tubular wrapping from a continuous web of heat-seal material, and for feeding the products successively into the tubular wrapping, each product being located between two free tubular portions of said tubular wrapping;

a sealing and feed assembly comprising at least two pairs of sealing devices movable along a sealing path to feed a respective product at a variable travelling speed along the sealing path, and to perform a respective sealing operation on a respective said tubular portion, each sealing device having a hot sealing surface;

wherein each sealing device comprises a heater for electrically heating the respective sealing surface wherein each sealing device has a control device that determines an actual temperature of the respective sealing surface, and for controlling said heater as a function of said actual temperature, and wherein each pair of sealing devices comprises an actuating device that moves a first of the pair of sealing devices with a law of motion independent of the law of motion of a second of the pair of sealing devices.

* * * * *